United States Patent
Tsunekawa

(10) Patent No.: US 8,248,295 B2
(45) Date of Patent: Aug. 21, 2012

(54) PRE-CRASH SAFETY SYSTEM

(75) Inventor: Jun Tsunekawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 307 days.

(21) Appl. No.: 12/671,618

(22) PCT Filed: Dec. 5, 2008

(86) PCT No.: PCT/JP2008/003626
§ 371 (c)(1),
(2), (4) Date: Feb. 1, 2010

(87) PCT Pub. No.: WO2010/064282
PCT Pub. Date: Jun. 10, 2010

(65) Prior Publication Data
US 2010/0271256 A1    Oct. 28, 2010

(51) Int. Cl.
*G01S 13/00* (2006.01)
(52) U.S. Cl. ............................ 342/70; 342/71; 342/72
(58) Field of Classification Search .............. 342/70–72, 342/118
See application file for complete search history.

(56) References Cited

U.S. PATENT DOCUMENTS

| | | | | |
|---|---|---|---|---|
| 4,097,864 A | * | 6/1978 | Endo et al. ...................... 342/71 |
| 4,158,841 A | * | 6/1979 | Wuchner et al. ................. 342/71 |
| 4,349,823 A | * | 9/1982 | Tagami et al. ................... 342/70 |
| 4,670,845 A | * | 6/1987 | Etoh ............................. 701/301 |
| 4,965,583 A | * | 10/1990 | Broxmeyer ..................... 342/42 |
| 5,023,617 A | * | 6/1991 | Deering .......................... 342/70 |
| 5,530,651 A | * | 6/1996 | Uemura et al. ................ 701/301 |
| 5,534,870 A | * | 7/1996 | Avignon et al. ................. 342/70 |
| 5,585,798 A | * | 12/1996 | Yoshioka et al. ............... 342/70 |
| 5,598,163 A | * | 1/1997 | Cornic et al. ................... 342/70 |
| 5,612,699 A | * | 3/1997 | Yamada ......................... 342/70 |
| 5,734,344 A | * | 3/1998 | Yamada ......................... 342/72 |
| 6,014,601 A | * | 1/2000 | Gustafson ...................... 701/45 |
| 6,114,951 A | * | 9/2000 | Kinoshita et al. ............. 340/436 |
| 6,216,082 B1 | * | 4/2001 | Minowa et al. ................. 701/96 |
| 6,265,991 B1 | * | 7/2001 | Nishiwaki et al. ............ 340/903 |
| 6,323,802 B1 | * | 11/2001 | Tokoro ........................... 342/70 |
| 6,359,553 B1 | * | 3/2002 | Kopischke ................... 340/436 |

(Continued)

FOREIGN PATENT DOCUMENTS

JP    6 174846    6/1994

(Continued)

*Primary Examiner* — Jack W Keith
*Assistant Examiner* — Peter Bythrow
(74) *Attorney, Agent, or Firm* — Oblon, Spivak, McClelland, Maier & Neustadt, L.L.P.

(57) ABSTRACT

A pre-crash safety system, which is not influenced by a false recognition that another vehicle is approaching and which causes the vehicle to conduct a safety measure operation when the possibility of a collision exists, is disclosed. The pre-crash safety system includes a collision prediction unit that makes the prediction of a collision between the vehicle and the another vehicle that has entered a monitoring area of the radar device; and a control unit that causes the own-vehicle to conduct the safety measure operation based on a result of the prediction of a collision by the collision prediction unit. The vehicle does not conduct the safety measure operation if, after the another vehicle has entered the monitoring area, a reflection point coordinate which represents a reflection point of a radar wave on the another vehicle is positioned within a predefined direction range when viewed from the vehicle.

9 Claims, 6 Drawing Sheets

U.S. PATENT DOCUMENTS

| | | | |
|---|---|---|---|
| 6,498,972 B1 * | 12/2002 | Rao et al. | 701/45 |
| 6,519,519 B1 * | 2/2003 | Stopczynski | 701/45 |
| 6,643,588 B1 * | 11/2003 | Ibrahim | 701/301 |
| 6,678,602 B2 * | 1/2004 | Winner et al. | 701/93 |
| 6,683,560 B2 * | 1/2004 | Bauhahn | 342/173 |
| 6,775,605 B2 * | 8/2004 | Rao et al. | 701/45 |
| 6,819,991 B2 * | 11/2004 | Rao et al. | 701/45 |
| 7,009,500 B2 * | 3/2006 | Rao et al. | 340/435 |
| 7,068,211 B2 * | 6/2006 | Oswald et al. | 342/70 |
| 7,409,295 B2 * | 8/2008 | Paradie | 701/301 |
| 7,613,568 B2 * | 11/2009 | Kawasaki | 701/301 |
| 7,616,101 B2 * | 11/2009 | Kuttenberger et al. | 340/435 |
| 7,675,457 B2 * | 3/2010 | Nakanishi | 342/133 |
| 7,742,864 B2 * | 6/2010 | Sekiguchi | 701/96 |
| 7,753,153 B2 * | 7/2010 | Swoboda et al. | 180/170 |
| 7,777,618 B2 * | 8/2010 | Schiffmann et al. | 340/436 |
| 2006/0262009 A1 * | 11/2006 | Watanabe et al. | 342/159 |

FOREIGN PATENT DOCUMENTS

| | | |
|---|---|---|
| JP | 9 132095 | 5/1997 |
| JP | 10 27299 | 1/1998 |
| JP | 11 23705 | 1/1999 |
| JP | 2005 249742 | 9/2005 |
| JP | 2006 188129 | 7/2006 |
| JP | 2007 38882 | 2/2007 |
| JP | 2007 91207 | 4/2007 |
| JP | 2008 70999 | 3/2008 |

* cited by examiner

PRE-CRASH SAFETY SYSTEM

TECHNICAL FIELD

The present invention relates to a pre-crash safety system; in particular, relates to a pre-crash safety system in which, even when, due to a movement of a reflection point of a radar wave on a surface of another vehicle, a radar device falsely recognizes that the other vehicle is approaching toward an own-vehicle, such a false recognition does not influence a safety measure operation that is based on a prediction of a collision.

BACKGROUND ART

Recently, a pre-crash safety system has been developed in which, a positional coordinate point and a relative velocity of another vehicle relative to an own-vehicle are acquired by a radar device, and a degree of risk of a collision between the other vehicle and the own-vehicle is calculated based on the acquired positional coordinate point and relative velocity, and if it is judged that the degree of risk is high, an appropriate safety measure is taken.

The pre-crash safety system includes: a radar device that acquires the positional coordinate point and relative velocity of the other vehicle; and an electronic control unit (ECU) which calculates, based on the acquired positional coordinate point and relative velocity, the degree of risk of a collision between the other vehicle and the own-vehicle, and which, if it is judged that the degree of risk is high, causes, a seat belt to conduct a fastening operation and a brake to conduct a braking operation.

FIG. 9, FIG. 10, and FIG. 11 are figures showing, in a chronological order, a positional relationship between an own-vehicle 20 equipped with a pre-crash safety system, and another vehicle 21 that is traveling in an oncoming lane. The own-vehicle 20 includes: a radar device 22 that monitors a diagonally forward left direction; a radar device that monitors a forward direction (not diagrammatically represented); and a radar device that monitors a diagonally forward right direction (not diagrammatically represented). 23, which is a reference character, indicates a monitoring area of the radar device that monitors the diagonally forward left direction. As shown in examples in FIG. 9, FIG. 10, and FIG. 11, the monitoring area 23 has a sector-like shape. Diagrammatic representation, of a monitoring area of the radar device that monitors the forward direction and of a monitoring area of the radar device that monitors the diagonally forward right direction, are omitted.

In FIG. 9, FIG. 10, and FIG. 11, a case is being assumed where the other vehicle 21 in the oncoming lane passes by so as to skim a right corner portion of the monitoring area 23, while the own-vehicle 20 is traveling along a leftward-curved road. The radar device 22 acquires a positional coordinate point K of the other vehicle 21 in a constant cycle (e.g. 20 msec). One example of a track of the positional coordinate point K of the other vehicle 21, acquired by the radar device 22 will be described in the following. The track shown in the following is merely one example, and the track of the positional coordinate point K of the other vehicle 21 is not limited to this example.

First, as shown in FIG. 9, a front right corner portion of the other vehicle 21 is acquired as a positional coordinate point K1 of the other vehicle 21. In the next moment, as shown in FIG. 10, a right side portion of the other vehicle 21 is acquired as a positional coordinate point K2 of the other vehicle 21. In the further next moment, as shown in FIG. 11, a rear wheel tire-housing portion of the other vehicle 21 is acquired as a positional coordinate point K3 of the other vehicle 21.

As shown in FIG. 9, FIG. 10, and FIG. 11, in reality, the other vehicle 21 and the own-vehicle 20 are traveling so as to pass by each other. However, as shown in FIG. 11, the positional coordinate point K of the other vehicle 21 is proceeding in a sequence of K1->K2->K3, as if the other vehicle 21 is approaching toward the own-vehicle 20. This is a result of, a point, in which a transmission wave from the radar device 22 is strongly reflected (hereinafter, referred to as a reflection point), moving gradually from the front right corner portion, to the right side portion, and to the rear wheel tire housing portion of the other vehicle 21.

When such a phenomenon occurs, it is difficult for the radar device 22 to determine whether the other vehicle 21 is, in fact, approaching toward the own-vehicle 20, or, due to the movement of the reflection point on the surface of the other vehicle 21, it only appears that the other vehicle 21 is approaching toward the own-vehicle 20. When the radar device falsely recognizes that the other vehicle 21 is approaching toward the own-vehicle 20, even though the other vehicle 21 is, in fact, not approaching toward the own-vehicle 20 (the other vehicle 4 and the own-vehicle 3 are only traveling so as to pass by each other), an incorrect prediction of a collision may be derived if the own-vehicle 3 makes a prediction of a collision based on the positional coordinate point K of the other vehicle 21.

Patent document 1 discloses a technology in which a prediction of a collision is made based on a detection result from a radar device. However, this technology does not consider an occurrence of the phenomenon described above, thus, an incorrect prediction of a collision may be derived when the above described phenomenon occurs.

[Patent Document 1] Japanese Patent Laid-Open No. H6-174846

DISCLOSURE OF THE INVENTION

Problems to be Solved by the Invention

The present invention takes into account of the problem described above, and an objective is to provide a pre-crash safety system in which, even when, due to a movement of a reflection point of a radar wave on a surface of another vehicle, a radar device falsely recognizes that the other vehicle is approaching toward an own-vehicle, such a false recognition does not influence a safety measure operation that is based on a prediction of a collision.

Solution to the Problems

A first aspect of the present invention is a pre-crash safety system causing, when a possibility of a collision between a first mobile object equipped with a radar device and a second mobile object that approaches the first mobile object exists after a prediction of a collision therebetween is made, the first mobile object to conduct a safety measure operation, the pre-crash safety system including:

a collision prediction unit that makes the prediction of a collision between the first mobile and the second mobile object that has entered a monitoring area of the radar device object; and a control unit that causes the first mobile object to conduct the safety measure operation based on a result of the prediction of a collision made by the collision prediction unit, wherein the control unit does not cause the first mobile object to conduct the safety measure operation if, after the second mobile object has entered the monitoring area, a reflection point coordinate which represents a reflection point of a radar wave on the second mobile object is positioned within a predefined direction range when viewed from the first mobile object, and the predefined direction range is a range in which the second mobile object is possibly falsely recognized, by the radar device, to be approaching toward the first mobile object due to a movement of a reflection point of a radar wave on a surface of the second mobile object even though the second mobile object is, in fact, not approaching toward the first mobile object.

According to the first aspect, the control unit does not cause the first mobile object to conduct the safety measure operation if, after the second mobile object has entered the monitoring area of the radar device, the reflection point coordinate which represents the reflection point of the radar wave on the second mobile object is positioned within the predefined direction range when viewed from the first mobile object. As a result, even when, due to a movement of a reflection point of the radar wave on a surface of the second mobile object, the radar device falsely recognizes that the second mobile object is approaching toward the first mobile object, such a false recognition does not influence the safety measure operation that is based on a prediction of a collision. Furthermore, according to the first aspect, even when, due to a movement of the reflection point of the radar wave on the surface of the second mobile object, the radar device falsely recognizes that the second mobile object is approaching toward the first mobile object, such a false recognition does not influence the safety measure operation that is based on the prediction of a collision.

The "first mobile object" and the "second mobile object" according to the first aspect are not limited to a particular type; however, vehicles such as an automobile and the like can be listed as examples. Additionally, the "safety measure operation" according to the first aspect is not limited to a particular type; however, an alarm output toward a driver, and a braking operation using brakes can be listed as examples. In particular, the "alarm output", which is an operation applied when a time until a predicted collision time is relatively long, is preferred.

A second aspect of the present invention is characterized in that, in the first aspect of the present invention, the monitoring area has a sector-like shape, and the predefined direction range includes a part of the monitoring area that is in proximity of an intersection point of an arc and a radius of the monitoring area.

There is a high possibility that the radar device will perform a false recognition at the part of the monitoring area that is in proximity of the intersection point of the arc and the radius of the monitoring area. According to the second aspect, when the reflection point of the radar wave is positioned in this part, the control unit does not cause the first mobile object to conduct the safety measure operation that is based on the prediction of a collision. Therefore, according to the second aspect, the false recognition by the radar device can be prevented from, with certainty, influencing the safety measure operation that is based on the prediction of a collision.

A third aspect of the present invention is characterized in that, in the second aspect of the present invention, a track of the reflection point is along the radius.

There is a high possibility that the radar device will perform a false recognition, in the part of the monitoring area that is in proximity of the intersection point of the arc and the radius of the monitoring area, when the track of the reflection point is along the radius. In this case, in the third aspect, the control unit does not cause the first mobile object to conduct the safety measure operation that is based on the prediction of a collision. Therefore, according to the third aspect, the false recognition by the radar device can be prevented from, with certainty, influencing the safety measure operation that is based on the prediction of a collision.

A fourth aspect of the present invention is characterized in that, in the first aspect of the present invention, the predefined direction range changes depending on a curvature of a road on which the first mobile object and the second mobile object proceed.

According to the fourth aspect, the predefined direction range changes depending on the curvature of the road. Therefore, according to the fourth aspect, even when the curvature of the road changes, the false recognition by the radar device can be prevented from influencing the safety measure operation that is based on the prediction of a collision.

A fifth aspect of the present invention is characterized in that, in the first aspect of the present invention, the predefined direction range is individually configured for every type of the safety measure operation.

According to the fifth aspect, the predefined direction range is individually configured for every type of the safety measure operation. Therefore, according to the fifth aspect, the predefined direction range can be configured properly depending on the type of the safety measure operation.

Effect of the Invention

According to the present invention, even when, due to a movement of the reflection point of the radar wave on the surface of the second mobile object (other vehicle), the second mobile object is falsely recognized to be approaching toward the first mobile object (own-vehicle), such a false recognition does not influence the safety measure operation that is based on the prediction of a collision.

Figure 1:
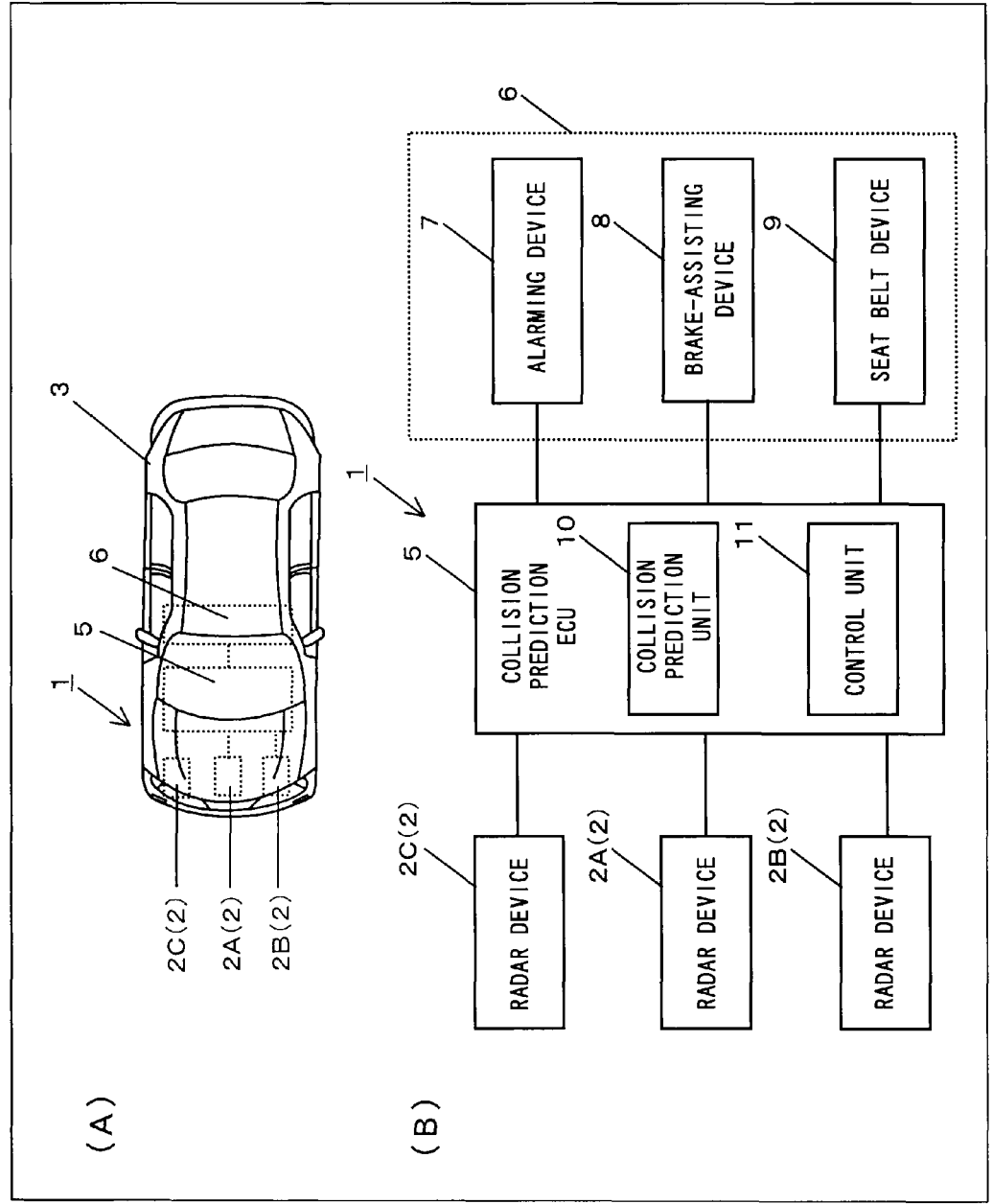
FIG. 1 is a figure showing a pre-crash safety system according to a first embodiment of the present invention.

DESCRIPTION OF THE REFERENCE CHARACTERS 1 pre-crash safety system
2 radar device
3 first mobile object (own-vehicle)
4 second mobile object (other vehicle)
5 collision prediction ECU
6 safety device
7 alarming device
8 brake-assisting device
9 seat belt device
10 collision prediction unit
11 control unit
12 monitoring area
14 predefined direction range
L arc
P, P1, P2, P3 positional coordinate point (reflection point coordinate)
R radius
θ azimuth of other vehicle

BEST MODE FOR CARRYING OUT THE INVENTION (First Embodiment)

A first embodiment of the present invention will be described with reference to drawings.

Figure 2:
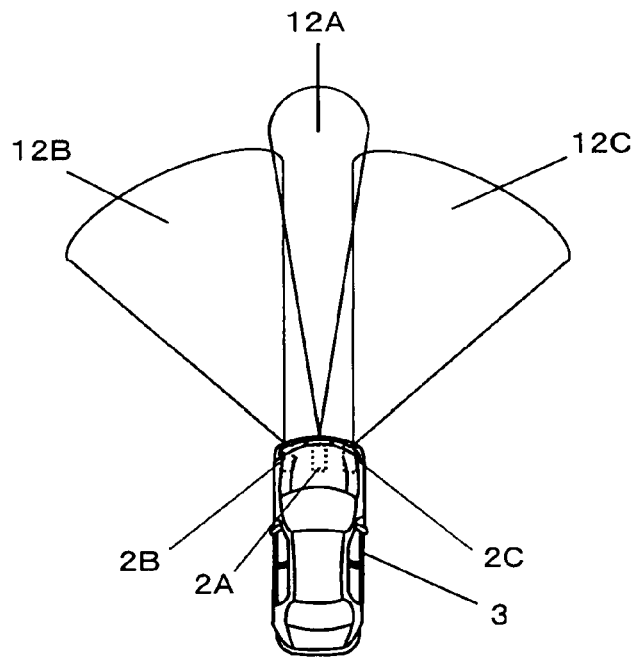
FIG. 2 is a figure showing one example of a monitoring area of a radar device according to the first embodiment.

FIG. 1 is a figure showing a pre-crash safety system according to the first embodiment. FIG. 2 is a figure showing one example of a monitoring area of a radar device that is included in the pre-crash safety system.

As shown in (A) of FIG. 1, a pre-crash safety system 1 according to the first embodiment is mounted on a first mobile object 3. The pre-crash safety system 1 makes a prediction of a collision between the first mobile object 3 equipped with a radar device 2 and a second mobile object 4 that is approaching toward the first mobile object 3; and when there is a possibility of a collision, causes the first mobile object 3 to conduct a safety measure operation. The first mobile object 3 and the second mobile object 4 are not limited to a particular type; however, a vehicle such as an automobile and the like can be listed as examples. In the following description, the first mobile object 3 is referred to as an own-vehicle 3, and the second mobile object 4 is referred to as another vehicle 4.

As shown in (B) of FIG. 1, the pre-crash safety system 1 includes: the radar device 2, a collision prediction ECU 5, and a safety device 6.

The radar device 2 acquires a positional coordinate point and a relative velocity of the other vehicle 4. The radar device 2 is not limited to a particular type; and, for example, an FM-CW radar may be used. As shown in (A) of FIG. 1, the pre-crash safety system 1 includes: a radar device 2A that monitors a forward direction; a radar device 2B that monitors a diagonally forward left direction; and a radar device 2C that monitors a diagonally forward right direction. In FIG. 2, reference characters 12A, 12B, and 12C respectively show a monitoring area of the radar device 2A, a monitoring area of the radar device 2B, and a monitoring area of the radar device 2C. The monitoring areas 12A, 12B, and 12C have sector-like shapes.

The collision prediction ECU 5 calculates a degree of risk of a collision between the other vehicle 4 and the own-vehicle 3, based on the positional coordinate point and relative velocity acquired by the radar device 2; and when it is judged that the degree of risk is high, causes the safety device 6 to conduct a safety measure operation. Detailed description of a specific degree of risk calculation method is omitted, since commonly known technologies thereof exist.

The safety device 6 is not limited to a particular type; however, an alarming device 7, a brake-assisting device 8, and a seat belt device 9 can be listed as examples. The alarming device 7 outputs an alarm, to a driver of the own-vehicle 3 in an audio, and to a screen. The brake-assisting device 8 automatically conducts a braking operation. The seat belt device 9 automatically conducts a fastening operation of a seat belt.

The collision prediction ECU 5 includes a collision prediction unit 10, and a control unit 11.

The collision prediction unit 10 makes a prediction of a collision between the own-vehicle 3 and the other vehicle 4 that has entered the monitoring areas 12A, 12B, and 12C of the radar device 2; based on, relative to the own-vehicle 3, the positional coordinate point and relative velocity of the other vehicle 4, which are acquired by the radar device 2.

The control unit 11 causes the own-vehicle 3 to conduct a safety measure operation, based on a result of the prediction of a collision by the collision prediction unit 10. However, when a reflection point coordinate P of the radar wave on the other vehicle 4 is positioned within a predefined direction range when viewed from the own-vehicle 3, the control unit 11 does not cause the own-vehicle 3 to conduct the safety measure operation.

As the safety device 6 that does not cause the safety measure operation to be conducted when the reflection point coordinate P of the radar wave on the other vehicle 4 is positioned within the predefined direction range when viewed from the own-vehicle 3, a preferred safety device 6 is one in which an operation is initiated at a moment when a time until a collision predicted by the collision prediction ECU 5 (hereinafter, referred to as a TTC (Time To Collision)) is relatively long; and the alarming device 7 can be listed as one example. This is because, as later described, a false recognition, in which the radar device 2 misjudges a traveling direction of the other vehicle 4, occurs frequently at a corner portion of the sector-like shaped monitoring area 12. The alarm output by the alarming device 7 is conducted, for example, when TTC becomes 1.6 seconds or less.

Figure 3:
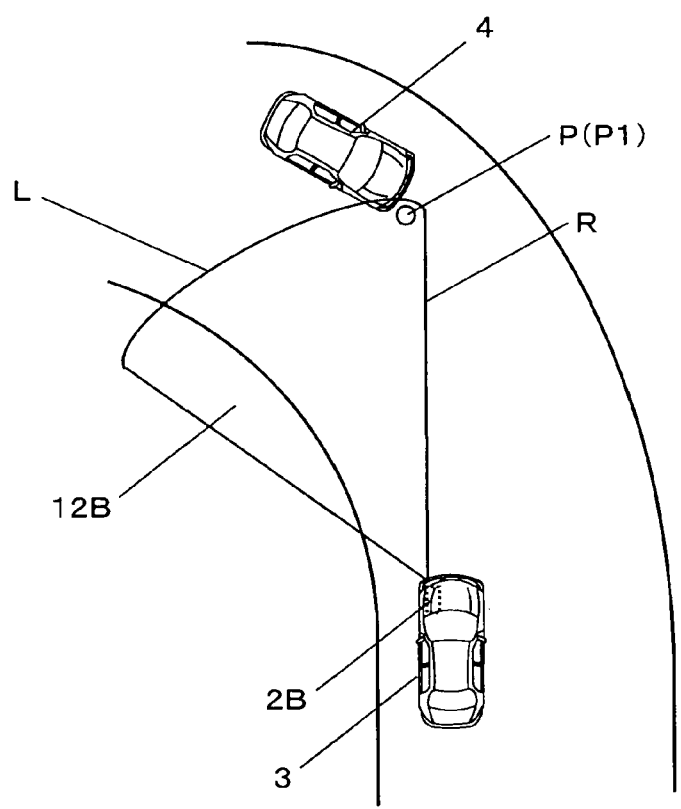
FIG. 3 is a figure showing, in a chronological order, a positional relationship between an own-vehicle equipped with the pre-crash safety system according to the first embodiment, and another vehicle that is traveling in an oncoming lane.
Figure 4:
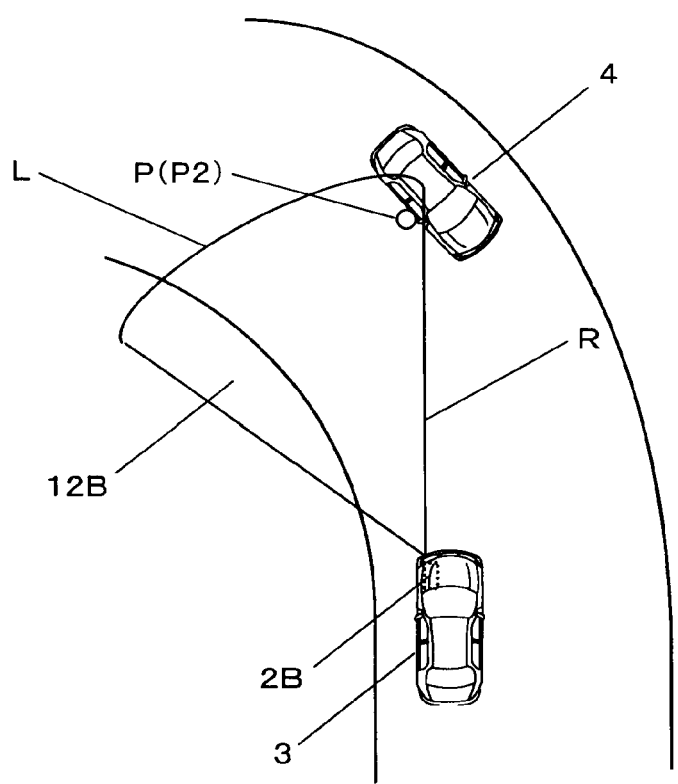
FIG. 4 is a figure showing, in a chronological order, a positional relationship between the own-vehicle equipped with the pre-crash safety system according to the first embodiment, and the other vehicle that is traveling in the oncoming lane.
Figure 5:
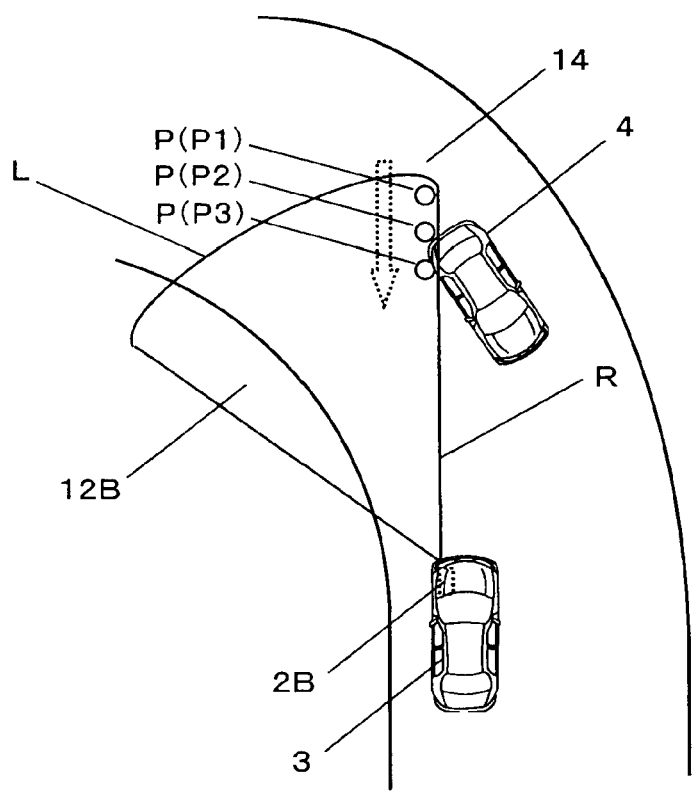
FIG. 5 is a figure showing, in a chronological order, a positional relationship between the own-vehicle equipped with the pre-crash safety system according to the first embodiment, and the other vehicle that is traveling in the oncoming lane.

A case where the control unit 11 does not cause the safety device 6 to conduct the safety measure operation will be described with reference to FIG. 3, FIG. 4, and FIG. 5. FIG. 3, FIG. 4, and FIG. 5 are figures showing positional relationships, in a chronological order, of the own-vehicle 3 equipped with the pre-crash safety system 1 and the other vehicle 4 that is traveling in the oncoming lane.

In FIG. 3, FIG. 4, and FIG. 5, a case is being assumed where the other vehicle 4 in the oncoming lane passes by so as to skim a right corner portion of the monitoring area 12B, while the own-vehicle 3 is traveling along a leftward-curved road. In the example shown in FIG. 3, FIG. 4, and FIG. 5, monitoring conducted by the radar devices 2A and 2C are not particularly important for the description; thus, diagrammatic representations and descriptions of the monitoring areas 12A and 12C are omitted. The radar device 2B acquires a positional coordinate point P of the other vehicle 4 in a constant cycle (e.g. 20 msec). The positional coordinate point P is a coordinate of a point where the radar wave is strongly reflected on the surface of the other vehicle 4 (hereinafter, referred to as a reflection point coordinate). A track of the positional coordinate point P shown in FIG. 5 is merely one example, and the track of the positional coordinate point P is not limited to this example.

First, as shown in FIG. 3, the radar device 2B acquires a front right corner portion of the other vehicle 4 as a positional coordinate point P1 of the other vehicle 4. In the next moment, as shown in FIG. 4, the radar device 2B acquires a right side portion of the other vehicle 4 as a positional coordinate point P2 of the other vehicle 4. In the further next moment, as shown in FIG. 5, the radar device 2B acquires a rear wheel tire-housing portion of the other vehicle 4 as a positional coordinate point P3 of the other vehicle 4.

As shown in FIG. 3, FIG. 4, and FIG. 5, in reality, the other vehicle 4 is traveling so as to pass by the own-vehicle 3, and is not traveling toward the own-vehicle 3. However, as shown in FIG. 5, the positional coordinate point P of the other vehicle 4 is proceeding in a sequence of P1->P2->P3, as if the other vehicle 4 is approaching toward the own-vehicle 3. This is a result of, a point, in which a transmission wave from the radar device 2 is strongly reflect (hereinafter, referred to as a reflection point), moving gradually from the front right corner portion, to the right side portion, and then to the rear wheel tire housing portion of the other vehicle 4.

When such a phenomenon occurs, it is difficult for the radar device 2 to determine whether the other vehicle 4 is, in fact, approaching toward the own-vehicle 3, or, due to the movement of the reflection point, it only appears that the other vehicle 4 is approaching toward the own-vehicle 3 from the front direction.

Figure 6:
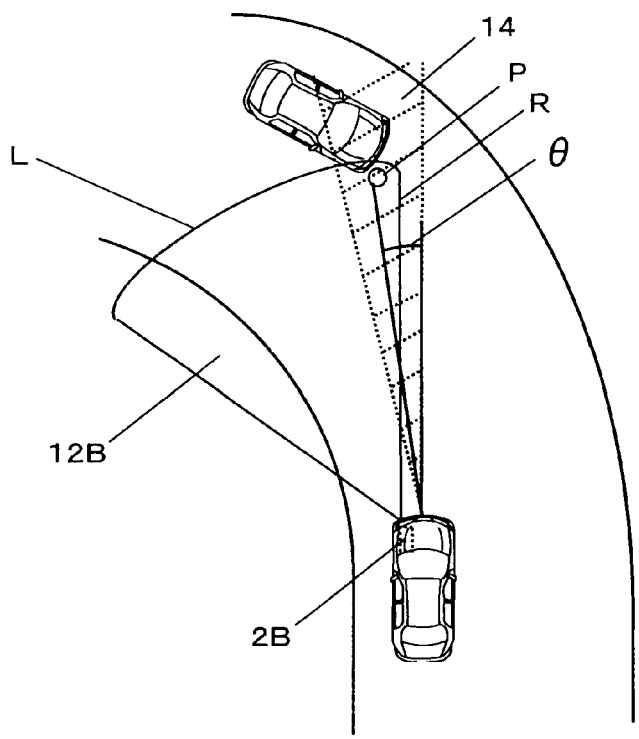
FIG. 6 is a figure showing a case in which a positional coordinate point is positioned within a predefined direction range when viewed from the own-vehicle in the first embodiment.

Therefore, according to the first embodiment, the control unit 11 does not cause the own-vehicle 3 to conduct the safety measure operation if, after the other vehicle 4 has entered the monitoring area 12, the reflection point coordinate of the radar wave on the other vehicle 4 (i.e. the positional coordinate point P acquired by the radar device 2) is positioned within a predefined direction range 14 when viewed from the own-vehicle 3 (area indicated by a dotted line in FIG. 6). As show in FIG. 3, FIG. 4, and FIG. 5, the "predefined direction range" is a range in which the radar device 2B possibly falsely recognizes that the other vehicle 4 is approaching toward the own-vehicle 3 due to the movement of the reflection point of the radar wave on the surface of the other vehicle 4 even though the other vehicle 4 is, in fact, not approaching toward the own-vehicle 3 and is only traveling so as to pass by the own-vehicle 3. A judgment of whether the positional coordinate point P is positioned within the predefined direction range 14 when viewed from the own-vehicle 3, is conducted by the collision prediction unit 10.

The monitoring area 12 normally has a sector-like shape. The predefined direction range 14 includes a part S which is in proximity of an intersection point of an arc L and a radius R of the monitoring area 12. The part S is a corner portion of the sector-like shaped monitoring area 12. In addition, a track of the reflection point of the radar wave, P1->P2->P3, normally is along the radius R.

Figure 7:
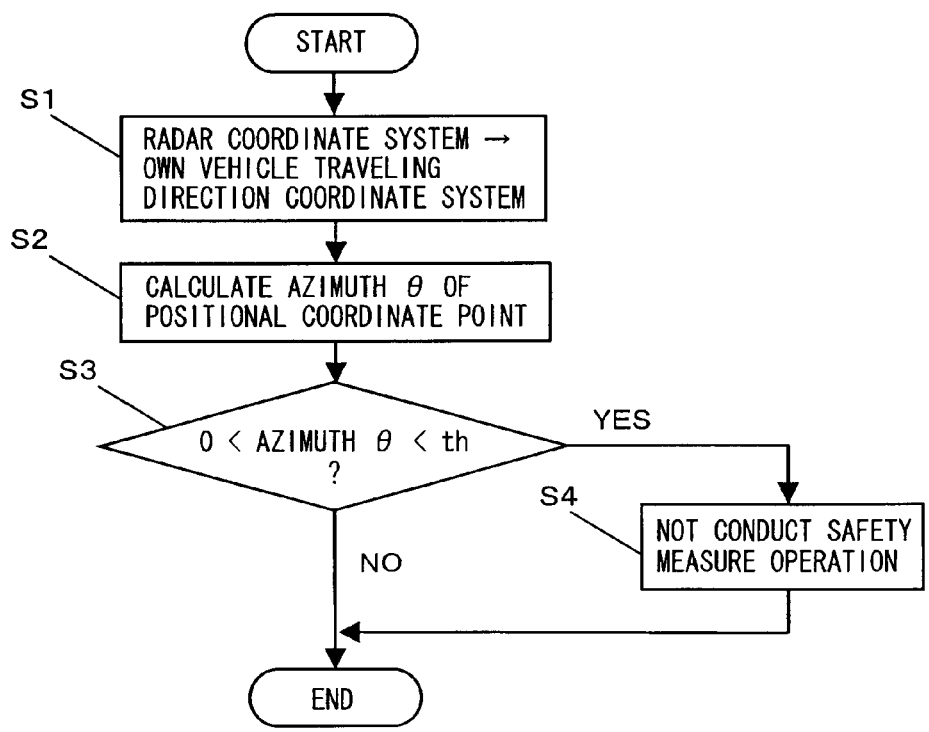
FIG. 7 is a flowchart showing a method for judging whether the positional coordinate point is positioned within the predefined direction range when viewed from the own-vehicle in the first embodiment.

A method for judging whether the positional coordinate point P is positioned within the predefined direction range 14 when viewed from the own-vehicle 3, is not limited to a particular method; and, for example, a method described in the following may be used. FIG. 6 is a figure showing a case in which the positional coordinate point P is positioned within the predefined direction range 14 when viewed from the own-vehicle 3. FIG. 7 is a flowchart showing a judging method.

As shown in FIG. 7, first, the collision prediction unit 10 converts the positional coordinate point P of the other vehicle 4 acquired by the radar device 2, from a radar coordinate system into an own-vehicle traveling direction coordinate system (step S1). The radar coordinate system is a coordinate system in which a point, where the radar device 2B is disposed on the own-vehicle 3 (normally, the left side of the tip portion of the own-vehicle 3), is defined as a point of origin, a front direction of the radar device 213 is defined as a Y-axis, and an axis that is orthogonal to the Y-axis is defined as an X-axis. As shown in FIG. 2, the front direction of the radar device 2B, which the monitoring area thereof is in the diagonally forward left direction, is facing toward the diagonally forward left direction of the own-vehicle 3. On the other hand, the own-vehicle traveling direction coordinate system is a coordinate system in which the center of the tip portion of the own-vehicle 3 is defined as a point of origin, the traveling direction of the own-vehicle 3 is defined as a Y-axis, and a direction that is orthogonal to the Y-axis is defined as an X-axis.

Next, an azimuth θ of the positional coordinate point P is calculated in the own-vehicle traveling direction coordinate system (step S2). A reference point for the azimuth θ is, for example, configured to be the center of the tip portion of the own-vehicle 3. Additionally, a reference direction of the azimuth θ is, for example, configured to be the traveling direction of the own-vehicle 3. In a case with such configurations, when the azimuth θ is 0, the positional coordinate point P is directly in the front when viewed from the center of the tip portion of the own-vehicle 3 (refer FIG. 6).

Next, a judgment is made whether the azimuth θ is located within the predefined direction range 14 (0<θ<th) (step S3). th is an upper limit value of the azimuth θ. The upper limit value th is not limited to a particular value, and for example, can be configured as 8°.

When the azimuth θ is within the predefined direction range 14 (YES at step S3), the collision prediction unit 10 instructs the control unit 11 not to cause the own-vehicle 3 to conduct the safety measure operation (step S4). On the other hand, when the azimuth θ is not within the predefined direction range 14 (NO at step S3), a process is ended. This series of process is repeated every time the radar device 2B acquires the positional coordinate point P.

Described above is one example of the method for judging whether the positional coordinate point P is positioned within the predefined direction range 14 when viewed from the own-vehicle 3.

As describe above, according to the first embodiment, the control unit 11 does not cause the own-vehicle 3 to conduct the safety measure operation if, after the other vehicle 4 has entered the monitoring area 12, the reflection point coordinate of the radar wave on the other vehicle 4 (i.e. the positional coordinate point P) is positioned within the predefined direction range 14 when viewed from the own-vehicle 3. Therefore, when the radar device 2 falsely recognizes that the other vehicle 4 is approaching toward the own-vehicle 3 due to the movement of the reflection point of the radar wave: a prediction of a collision based on the positional coordinate point P of the other vehicle 4 is not made; or, even when an incorrect prediction of a collision is made, the safety measure operation of the safety device 6 based on the result of the prediction of a collision is not conducted. Therefore, even when, due to the movement of the reflection point of the radar wave on the surface of the other vehicle 4, the radar device 2B falsely recognizes that the other vehicle 4 is approaching toward the own-vehicle 3, such a false recognition does not influence the safety measure operation that is based on the prediction of a collision.

A threshold th can be changed depending on a curvature of a road on which the own-vehicle 3 and the other vehicle 4 proceed. As a radius of curvature of the road becomes smaller, it is known that a direction range, in which the false recognition occurs due to the movement of the reflection point, becomes larger. By applying a change depending on the curvature of the road on which the own-vehicle 3 and the other vehicle 4 proceed, even when the curvature of the road is altered, the safety measure operation that is based on the prediction of a collision is not influenced.

In addition, the threshold th can be individually configured for every type of the safety measure operation. A timing when the operation is initiated is different for every type of the safety measure operation. For example, the alarm output by the alarming device 7 is initiated when the TTC is 1.6 seconds, and the braking by the brake-assisting device 8 is initiated when the TTC is 1 second. As the TTC becomes smaller, a distance between the own-vehicle 3 and the other vehicle 4 becomes smaller. It has been experimentally confirmed that a direction range, in which the false recognition by the radar device 2B occurs, becomes larger as the distance between the own-vehicle 3 and the other vehicle 4 becomes smaller. Thus, by individually configuring the threshold th for every type of the safety measure operation, the safety measure operation that is based on the prediction of a collision is not influenced even when the type of the safety measure operation is different.

Figure 8:
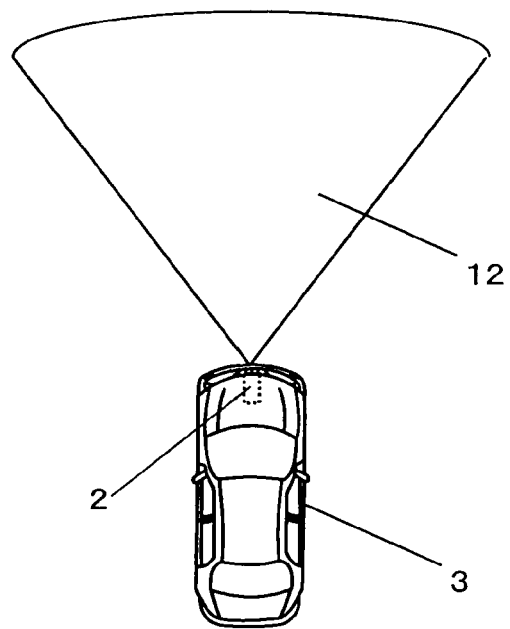
FIG. 8 is a figure showing another example of the monitoring area of the radar device in the first embodiment.
Figure 9:
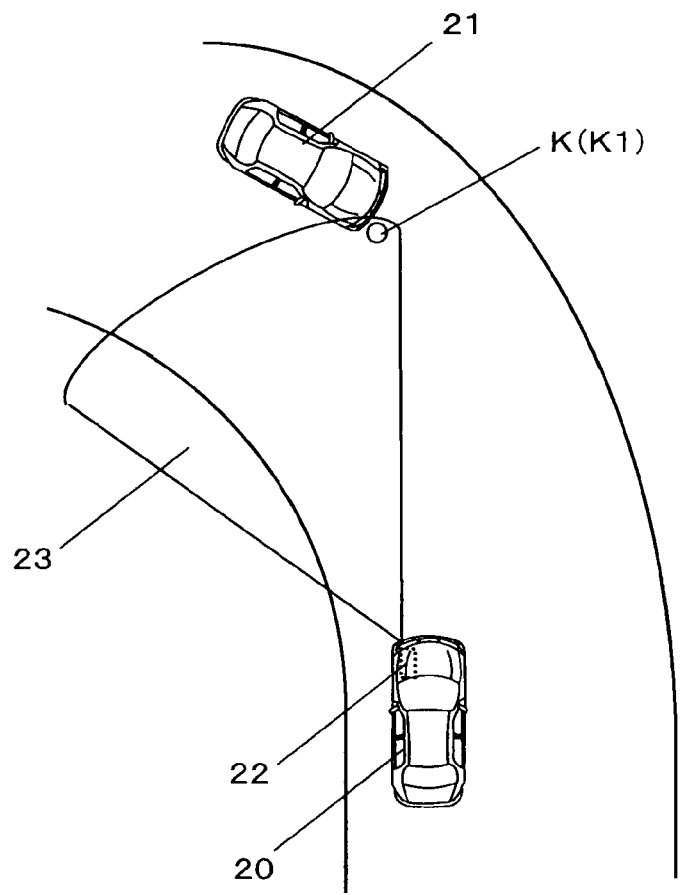
FIG. 9 is a figure showing, in a chronological order, a positional relationship between the own-vehicle equipped with the pre-crash safety system, and the other vehicle that is traveling in the oncoming lane.
Figure 10:
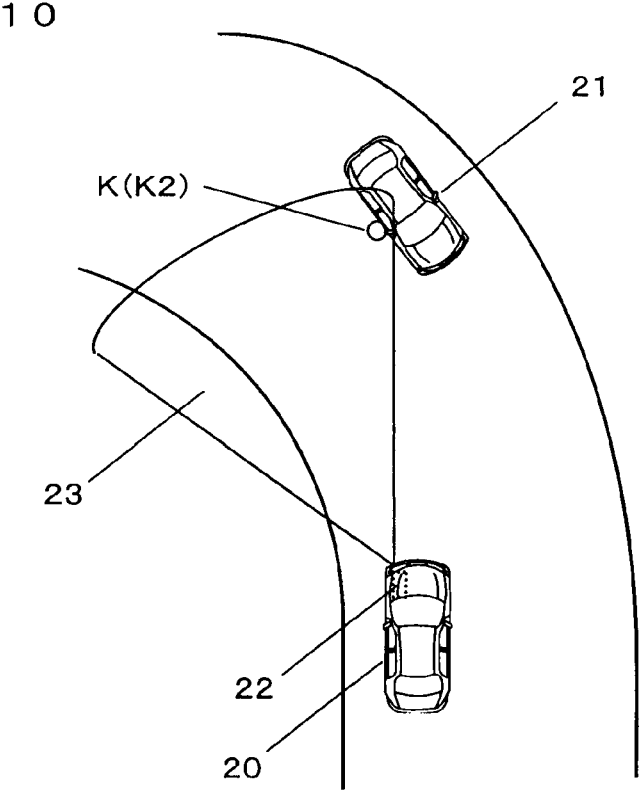
FIG. 10 is a figure showing, in a chronological order, a positional relationship between the own-vehicle equipped with the pre-crash safety system, and the other vehicle that is traveling in the oncoming lane.
Figure 11:
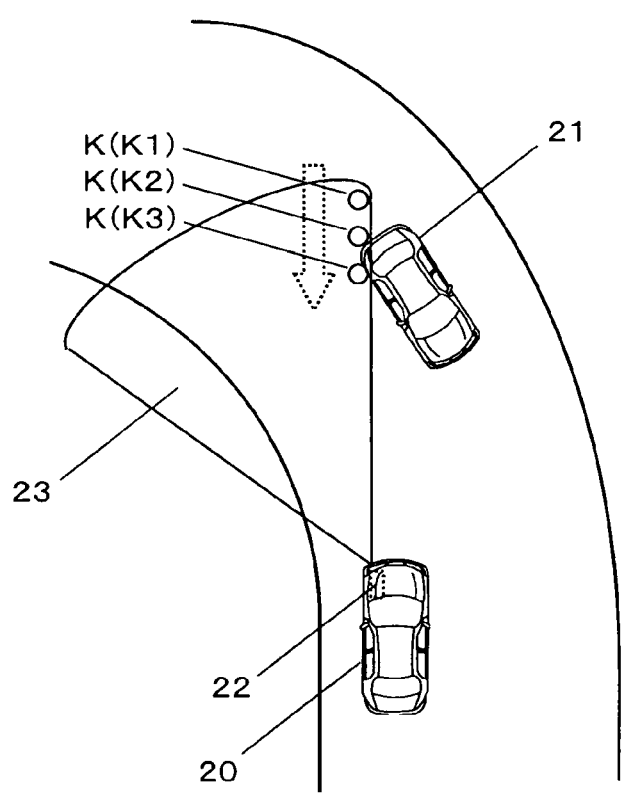
FIG. 11 is a figure showing, in a chronological order, a positional relationship between the own-vehicle equipped with the pre-crash safety system, and the other vehicle that is traveling in the oncoming lane.

The example shown in FIG. 1 is one in which the number of the radar devices 2 is three; however, the number of radar devices may be one, as shown in FIG. 8, or may be two, or may be four or more. The monitoring area 12 of a single radar device 2 may be configured widely in a vehicle width direction, as shown in FIG. 8.

Furthermore, the example shown in FIG. 3, FIG. 4, and FIG. 5 is one in which the radar device 2B falsely recognizes the traveling direction of the other vehicle 4; however, there is a possibility that the radar devices 2A and 2C similarly perform false recognitions. Even if similar false recognitions occur at the radar devices 2A and 2C, by conducting processes similar in the case of the radar device 2B, the safety measure operation that is based on the prediction of a collision is not influenced by the false recognitions.

Industrial Applicability

The present invention is applicable to a vehicle or the like, which is equipped with a pre-crash safety system.

The invention claimed is:

1. A pre-crash safety system causing, when a possibility of a collision between a first mobile object equipped with a radar device and a second mobile object that approaches the first mobile object exists after a prediction of a collision therebetween is made, the first mobile object to conduct a safety measure operation, the pre-crash safety system comprising:
    a collision prediction unit that makes the prediction of a collision between the first mobile object and the second mobile object that has entered a monitoring area of the radar device; and
    a control unit that causes the first mobile object to conduct the safety measure operation based on a result of the prediction of a collision made by the collision prediction unit, wherein
    the control unit does not cause the first mobile object to conduct the safety measure operation if, after the second mobile object has entered the monitoring area, a reflection point coordinate which represents a reflection point of a radar wave on the second mobile object is positioned within a predefined direction range which is a range from a predetermined first direction to a predetermined second direction when viewed from the first mobile object, and
    the predefined direction range is a range in which the second mobile object is possibly falsely recognized, by the radar device, to be approaching toward the first mobile object due to a movement of a reflection point of a radar wave on a surface of the second mobile object even though the second mobile object is, in fact, not approaching toward the first mobile object.

2. The pre-crash safety system according to claim 1, wherein
    the monitoring area has a sector-like shape; and
    the predefined direction range includes a part of the monitoring area that is in proximity of an intersection point of an arc and a radius of the monitoring area.

3. The pre-crash safety system according to claim 2, wherein a track of the reflection point is along the radius.

4. The pre-crash safety system according to claim 1, wherein the predefined direction range changes depending on a curvature of a road on which the first mobile object and the second mobile object proceed.

5. The pre-crash safety system according to claim 1, wherein the predefined direction range is individually configured for every type of the safety measure operation.

6. The pre-crash safety system according to claim 2, wherein the predefined direction range changes depending on a curvature of a road on which the first mobile object and the second mobile object proceed.

7. The pre-crash safety system according to claim 3, wherein the predefined direction range changes depending on a curvature of a road on which the first mobile object and the second mobile object proceed.

8. The pre-crash safety system according to claim 2, wherein the predefined direction range is individually configured for every type of the safety measure operation.

9. The pre-crash safety system according to claim 3, wherein the predefined direction range is individually configured for every type of the safety measure operation.

* * * * *